G. E. CLIVER.
Motors for Railway Cars.
No. 166,070.                            Patented July 27, 1875.
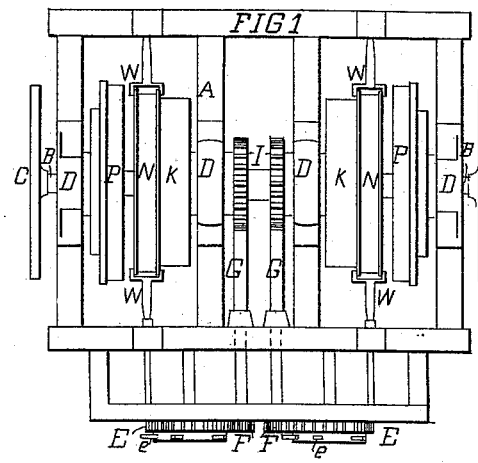
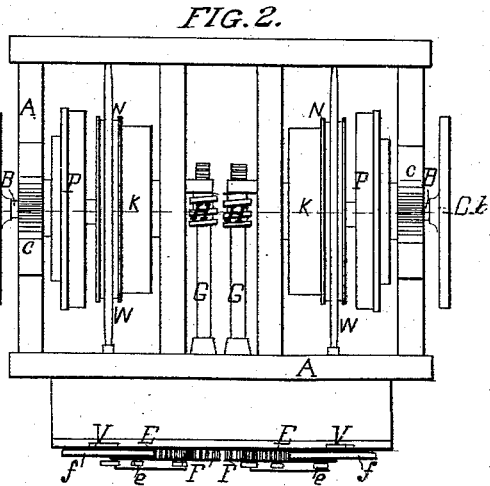
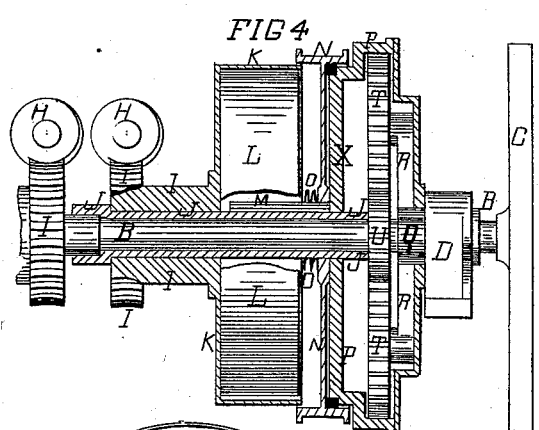
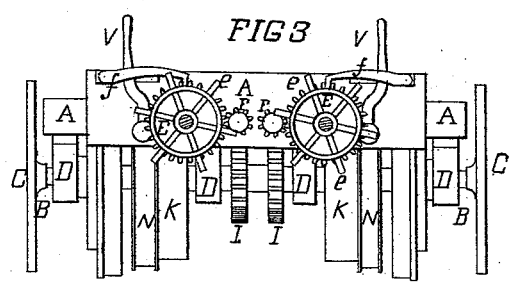
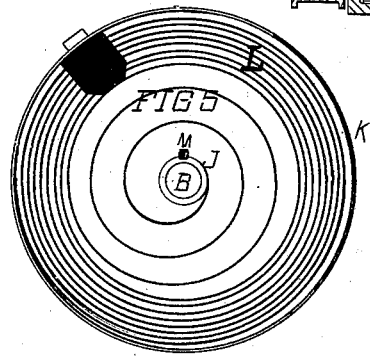
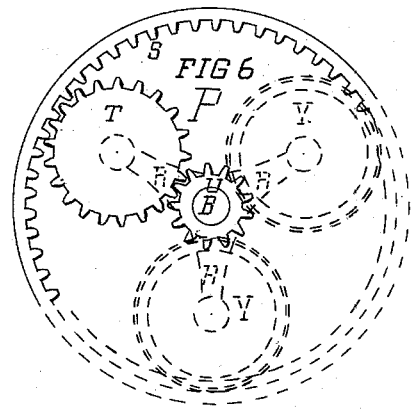
WITNESSES
Chas F. Van Horne
A. R. Burchell
INVENTOR
George E. Cliver
by Francis D. Pastorius
Atty

UNITED STATES PATENT OFFICE.

GEORGE E. CLIVER, OF PHILADELPHIA, PENNSYLVANIA, ASSIGNOR TO HIMSELF AND ROBERT EASTMAN, OF SAME PLACE.

IMPROVEMENT IN MOTORS FOR RAILWAY-CARS.

Specification forming part of Letters Patent No. 166,070, dated July 27, 1875; application filed May 27, 1875.

*To all whom it may concern:*

Be it known that I, GEORGE E. CLIVER, of Philadelphia, Pennsylvania, have Invented an Improved Motor for Railway-Cars, of which the following is a specification.

The invention is so fully and accurately described hereinafter that a preliminary description is not deemed necessary.

Figure 1 is a bottom-plan view. Fig. 2 is a top-plan view. Fig. 3 is an end view. Fig. 4 is a vertical section through the line $a\,b$, Fig. 2. Fig. 5 is a view of the actuating-spring and its case. Fig. 6 shows the means employed for transmitting the power of the springs to the axle.

The weight of the car-body is conveyed to trucks at the ends of the same by means of springs. Center-pins permit it to conform to their movements. The mechanism of each truck is divided centrally, that of both sides being precisely alike. The axle extends the width of the truck, and is indirectly acted on by the actuating-springs of both sides, either simultaneously or singly.

A is the framing of the trucks, and $c$ the springs which carry the car-body. An axle, B, which extends the width of the truck, turns in boxes D, depending from the framing, and has the car-wheels C on its ends. E is a toothed wheel on the end of the car, which meshes into the pinion F on the shaft G of the worm or endless screw. I is a worm-wheel on the sleeve J, which incases the axle B. It forms part of the casing K of the spring L. One end of the spring L is fixed to the rim of the case K on the inside; the other end is fixed to the sleeve J. M is a feather on the sleeve J. N is a transmitting-wheel, which slides on the feather. O is a spiral spring between the casing K and the wheel N. P is an annular wheel, which turns on the sleeve J and the hub Q of the spider R. It has gear-teeth S formed on the internal edge of its rim, which gear with an intermediate wheel, T, on an arm of the spider R, which, in turn, gears with a pinion, U, on the shaft B. When pressure is applied to the handles $e$ they turn the toothed wheel E; its motion is transmitted, by the pinion F and its shaft G, to the endless screw H, which acts upon the teeth of the wheel I of the spring-case K, causing the case to turn and wind up the spring L, the recoil of which is prevented by a detent, $f$, which drops into the teeth of the wheel E, and keeps it from turning in the opposite direction. The motion of the machine, resulting from the action of the spring L on its case K, will not take place until the lever V of the shifting-clutch W is turned in the proper direction for moving the transmitting-wheel N into contact with the arm X of the annular wheel P, whereby the motion given to the case K by the spring L is transmitted to the intermediate wheel T, and from it to the pinion U of the axle B, which turns the wheels C, and sets the truck in motion. The reverse direction of the lever V throws the wheel N out of contact, and stops the machine. The spiral spring O keeps the transmitting-wheel N in contact with the annular wheel P when the machine is in motion.

As shown in Fig. 6, friction-rollers Y can be used for transmitting motion to the shaft B, in place of the gearing. The mechanism of both sides of the truck is wound up before starting, but only one is put in action at a time, the other being held in reserve until the power of the first has been expended.

I claim as my invention—

1. The combination of the spur-wheel E, pinion F, shaft G, screw H, worm-wheel I, case K, sleeve J, and the spring L, as shown and described.

2. The combination of the sleeve J, case K, spring L, feather M, transmitting-wheel N, spring O, and the annular wheel P, as shown and described.

3. The combination of the lever V, shifting-clutch W, transmitting-wheel N, sleeve J, feather M, spring O, and the wheel P, as shown and described.

4. The combination of the wheel P, spider R, gear-wheels T U, shaft B, and the sleeve J, as shown and described.

In testimony whereof I hereunto sign my name in presence of two subscribing witnesses.

GEORGE E. CLIVER.

Witnesses:
 FRANCIS D. PASTORIUS,
 THOMAS MARTEN.